United States Patent
Okutani

(10) Patent No.: US 12,288,886 B2
(45) Date of Patent: Apr. 29, 2025

(54) BATTERY

(71) Applicant: SANYO ELECTRIC CO., LTD., Osaka (JP)

(72) Inventor: Oose Okutani, Hyogo (JP)

(73) Assignee: PANASONIC ENERGY CO., LTD., Osaka (JP)

(*) Notice: Subject to any disclaimer, the term of this patent is extended or adjusted under 35 U.S.C. 154(b) by 531 days.

(21) Appl. No.: 17/045,439

(22) PCT Filed: Apr. 3, 2019

(86) PCT No.: PCT/JP2019/014857
§ 371 (c)(1),
(2) Date: Oct. 5, 2020

(87) PCT Pub. No.: WO2019/194239
PCT Pub. Date: Oct. 10, 2019

(65) Prior Publication Data
US 2021/0175566 A1 Jun. 10, 2021

(30) Foreign Application Priority Data
Apr. 6, 2018 (JP) ................................. 2018-074195

(51) Int. Cl.
*H01M 50/102* (2021.01)
*H01M 50/107* (2021.01)
(Continued)

(52) U.S. Cl.
CPC ....... *H01M 50/102* (2021.01); *H01M 50/107* (2021.01); *H01M 50/184* (2021.01); *H01M 50/186* (2021.01)

(58) Field of Classification Search
CPC ............. H01M 50/102; H01M 50/186; H01M 50/184; H01M 50/10; H01M 50/103;
(Continued)

(56) References Cited

U.S. PATENT DOCUMENTS 3,723,184 A * 3/1973 Stark et al. ......... H01M 50/166
429/174
6,399,237 B1 6/2002 Souliac et al.
(Continued)

FOREIGN PATENT DOCUMENTS

| CN | 1503394 A | 6/2004 |
| CN | 1770500 A | 5/2006 |

(Continued)

OTHER PUBLICATIONS

CueMatth.com (2022; https://www.cuemath.com/geometry/prism-definition/) (Year: 2022).*

(Continued)

*Primary Examiner* — Stewart A Fraser
*Assistant Examiner* — Lilia Nedialkova
(74) *Attorney, Agent, or Firm* — Rimon P.C.

(57) ABSTRACT

A battery including: an electrode body having a circular-cylindrical shape; and a battery can housing the electrode body. A battery can includes a cylindrical portion, a bottom wall closing one end of the cylindrical portion, and an open rim continuing to the other end of the cylindrical portion. The cylindrical portion has a shape of inner circumference including a corner portion.

12 Claims, 6 Drawing Sheets

(51) Int. Cl.
*H01M 50/184* (2021.01)
*H01M 50/186* (2021.01)

(58) Field of Classification Search
CPC ............. H01M 50/107; H01M 50/116; H01M 50/117; H01M 50/119; H01M 50/121; H01M 50/122; H01M 50/124; H01M 50/1243; H01M 50/1245; H01M 50/126; H01M 50/128; H01M 50/129; H01M 50/133; H01M 50/134; H01M 50/131; H01M 50/136; H01M 50/15; H01M 50/152; H01M 50/1566; H01M 10/0422; Y02E 60/10

See application file for complete search history.

(56) References Cited

U.S. PATENT DOCUMENTS

| | | | |
|---|---|---|---|
| 6,849,357 B1* | 2/2005 | Kasahara | H01M 10/6235 29/623.1 |
| 2003/0182792 A1 | 10/2003 | Katsumoto et al. | |
| 2004/0142237 A1 | 7/2004 | Asano | |
| 2006/0093904 A1 | 5/2006 | Cheon et al. | |
| 2008/0102366 A1* | 5/2008 | Anglin | H01M 50/154 429/174 |
| 2009/0214948 A1 | 8/2009 | Cheon et al. | |
| 2009/0269661 A1 | 10/2009 | Mori et al. | |
| 2011/0129708 A1* | 6/2011 | Doo | H01M 50/107 429/94 |
| 2012/0164494 A1* | 6/2012 | Schaefer | H01M 10/6554 977/773 |
| 2015/0004446 A1* | 1/2015 | Kim | H01M 50/169 29/623.2 |
| 2015/0132636 A1 | 5/2015 | Seong et al. | |
| 2018/0062124 A1 | 3/2018 | Kohira et al. | |

FOREIGN PATENT DOCUMENTS

| | | | |
|---|---|---|---|
| CN | 101180748 A | | 5/2008 |
| CN | 201717321 U | | 1/2011 |
| CN | 102709496 A | | 10/2012 |
| CN | 104285314 A | | 1/2015 |
| CN | 104781154 A | | 7/2015 |
| CN | 104885253 A | | 9/2015 |
| CN | 107431179 A | | 12/2017 |
| JP | S57-152763 U | | 9/1982 |
| JP | S58-131557 U | | 9/1983 |
| JP | S63-207048 U | | 8/1988 |
| JP | H07-14601 A | | 1/1995 |
| JP | H07-326370 A | | 12/1995 |
| JP | H09-266012 A | | 10/1997 |
| JP | H10-199495 A | | 7/1998 |
| JP | 2000-294201 A | | 10/2000 |
| JP | 2001-110372 A | | 4/2001 |
| JP | 2002093383 A | * | 3/2002 |
| JP | 2002-141100 A | | 5/2002 |
| JP | 2006-092761 A | | 4/2006 |
| JP | 2006-221988 A | | 8/2006 |
| JP | 2007-5092 A | | 1/2007 |
| JP | 2008192321 A | * | 8/2008 |
| JP | 2009-087803 A | | 4/2009 |
| JP | 2010-257733 A | | 11/2010 |
| JP | 2012-164522 A | | 8/2012 |

OTHER PUBLICATIONS

Machine translation of Japanese Patent Publication No. 2002-093383A, published Mar. 29, 2002. (Year: 2002).*
Machine translation of Japanese Patent Publication No. 2008-192321A, published Aug. 21, 2008. (Year: 2008).*
International Search Report issued Jun. 18, 2019 in International Application No. PCT/JP2019/014857 with English translation.
Chinese Office Action and Search Report with its partial English translation issued in the corresponding Chinese Patent Application No. 201980022991.4, mailed Apr. 22, 2022.

* cited by examiner

400

BATTERY

CROSS REFERENCE TO RELATED APPLICATIONS

This application is the U.S. National Phase under 35 U.S.C. § 371 of International Application No. PCT/JP2019/014857, filed on Apr. 3, 2019, which in turn claims the benefit of Japanese Application No. 2018-074195, filed on Apr. 6, 2018, the entire contents of each are hereby incorporated by reference.

TECHNICAL FIELD

The present invention relates to a battery including an electrode body and a battery can housing the electrode body.

BACKGROUND ART

With regard to the shape of the battery can (outer case), Patent Literature 1 discloses an outer case having an outer sidewall whose cross-sectional shape is made hexagonal for improving the heat dissipation efficiency, and an inner sidewall whose cross-sectional shape is made circular for suppressing the deformation of a battery unit due to an increase in internal pressure, as well as for bringing an electrode group into surface contact with the outer case.

CITATION LIST

Patent Literature

[PTL 1] Japanese Laid-Open Patent Publication No. 2010-257733

SUMMARY OF INVENTION

Technical Problem

In order to increase the battery energy density, improvements have been made to increase the space occupied by the electrode body in the battery can. In some cases, however, simply increasing the space occupied by the electrode body fails to ensure the amount of electrolyte sufficiently relative to the amount of positive and negative electrode active materials, failing to realize a higher energy density.

Solution to Problem

One aspect of the present invention relates to a battery including: an electrode body having a circular-cylindrical shape; and a battery can housing the electrode body, the battery can including a cylindrical portion, a bottom wall closing one end of the cylindrical portion, and an open rim continuing to the other end of the cylindrical portion, the cylindrical portion having a shape of inner circumference including a corner portion.

Advantageous Effects of Invention

According to the present invention, a higher battery energy density can be easily achieved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
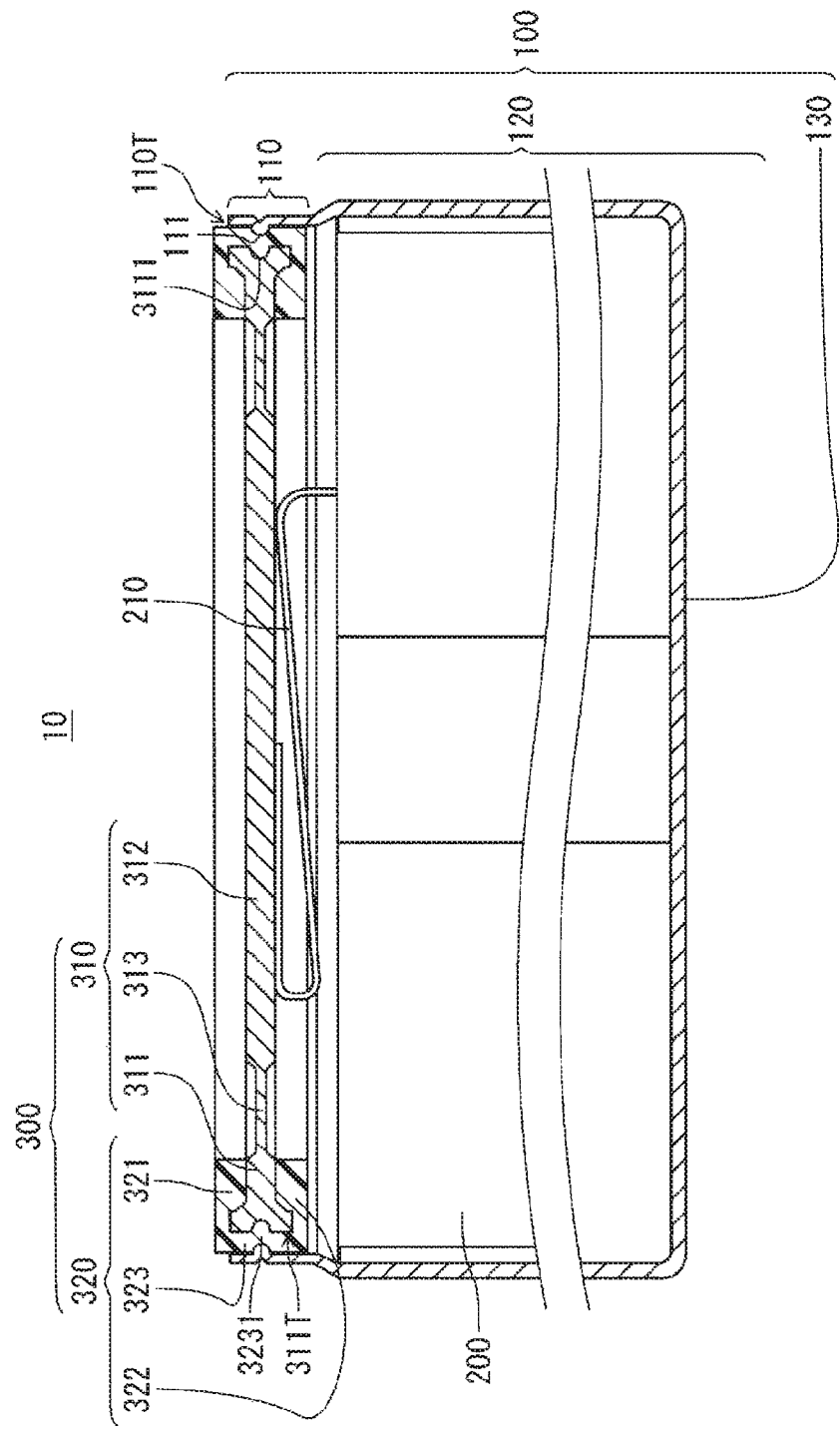
FIG. 1 A schematic vertical cross-sectional view of an essential part of a battery according to an embodiment of the present invention.

A battery according to the present invention includes: an electrode body having a circular-cylindrical shape; and a battery can housing the electrode body. The battery can includes a cylindrical portion, a bottom wall closing one end of the cylindrical portion, and an open rim continuing to the other end of the cylindrical portion. The cylindrical portion has a shape of inner circumference including a corner portion.

Here, the corner portion means, in a cross-sectional shape of the inner sidewall of the cylindrical portion taken along a plane perpendicular to the axis of the cylindrical portion (that is, shape of inner circumference), a space formed by at least two linear sides adjacent to each other, in the vicinity of the intersection of two sides (the vertex). Each side does not need to be a mathematically exact straight line, and may have some curvature. When the shape of inner circumference is composed only of substantially straight sides, the shape of inner circumference is polygonal, and a region in the vicinity of each vertex of the polygon constitutes the corner portion. The shape of inner circumference may include a curved-line portion (e.g., an arc). The shape of inner circumference may include a curved line portion and a straight-line portion in combination.

When the electrode body having a circular-cylindrical shape is housed in the cylindrical portion, there is left a space at the corner portion, the space unoccupied by the electrode body. In the battery of the present embodiment, this space can serve to retain electrolyte, and thus, to prevent electrolyte depletion. Therefore, even when the electrode body is highly densely placed in the battery can, it is possible to increase the volume of the electrode body and ensure a sufficient amount of electrolyte, which can realize a battery excellent in resistance to the lifetime deterioration associated with electrolyte depletion.

When the shape of inner circumference is a polygonal shape, the polygonal shape is not limited to a regular polygon. However, in view of preventing non-uniform distribution of electrolyte in the inner circumferential direction, the corner portions in which the electrolyte can be retained are preferably arranged uniformly in the inner circumferential direction. Therefore, the shape of inner circumference of the cylindrical portion is preferably a regular polygon.

When the electrode body having a circular-cylindrical shape is housed in the cylindrical portion having a shape of inner circumference being a polygonal shape, a maximum diameter of the electrode body that can be housed therein is equal to or larger than the length of the diameter of the inscribed circle of a polygon defining the polygonal shape. Therefore, by making the outer diameter of the electrode body substantially equal to the length of the diameter of the inscribed circle, the energy density of the battery can be increased to a maximum extent. On the other hand, in the rest portions (corner portions) in the polygon excluding the inscribed circle, the electrolyte can be retained.

Here, that the outer diameter of the electrode body is substantially equal to the length of the diameter of the inscribed circle means that, with taken into account a tolerance in battery production and the like, the outer diameter of the electrode body is equal to the length of the diameter of the inscribed circle within a range of ±100 μm.

In the height direction (axial direction) of the cylindrical portion (hereinafter, sometimes referred to as Z direction) of the battery can, the position at which the shape of inner circumference includes the corner portion may be within any range of height of the cylindrical portion, but preferably, throughout its height direction, the cylindrical portion has a shape of inner circumference including the corner portion. Moreover, in the inner circumferential direction, the positions at which the corner portion is provided may be different along the height direction of the cylindrical portion, but are preferably the same regardless of the height direction of the cylindrical portion.

Furthermore, when a cross-sectional shape of the outer sidewall (shape of outer circumference) of the cylindrical portion has a corner portion as in the case of the shape of inner circumference, the heat dissipation characteristics is improved by the increase of the surface area. Moreover, when the corner portion is provided at the same position in the outer circumferential direction within a certain height range of the cylindrical portion, the corner portion can be used for positioning of the battery and other purposes.

When the shape of inner circumference has a shape of a regular polygon, the smaller the number of the sides constituting the regular polygon is, the more the electrolyte can be retained in the corner portions. In view of allowing the corner portions to retain electrolyte sufficiently, the shape of inner circumference may be a regular polygon having, for example, 24 or less sides, or 20 or less, or 16 or less.

On the other hand, however, the smaller the number of the sides constituting the regular polygon is, the more difficult it is to apply a processing to the battery can for sealing the open rim of the battery can. For ease of processing of the battery can, the shape of inner circumference is preferably a regular polygon having 12 or more sides.

In the battery can, while the shape of inner circumference of the cylindrical portion includes the corner portion, the open rim preferably has a cross-sectional shape of the inner sidewall (shape of inner circumference) being a circular shape, for ease of sealing.

Conventionally, for sealing the open rim of the battery can, a constricted portion has been provided between the open rim and the cylindrical portion, such that the constricted portion has an inner diameter smaller than both the inner diameter of a circle defined by the open rim and the inner diameter (minimum inner diameter) of the cylindrical portion. On the constricted portion, a sealing plate is placed with a gasket interposed therebetween. Subsequently, the open rim of the metal can is pressed in the Z direction so as to curl over the gasket and the sealing plate, and crimped. In this case, the constricted portion is present more inward than the sealing plate in the Z direction. In this method, however, the inner space surrounded by the constricted portion has been a dead space where the electrode body cannot occupy, which has been an obstacle in obtaining a battery with a high energy density.

On the other hand, the electrolyte can be held in this dead space. Therefore, the electrolyte depletion has not been surfaced.

In contrast, by modifying the sealing method of the battery can and employing a sealing method without providing the constricted portion, the height of the electrode body having a circular-cylindrical shape can be increased, and thus, the energy density can be increased. However, with increasing the space occupied by the electrode body in the battery can, the space that can hold the electrolyte is reduced and becomes insufficient with respect to the amount of the positive and negative electrode active materials. As a result, the electrolyte depletion issue has been surfaced.

On the other hand, in the case of providing the constricted portion, it is not easy to apply a constricting processing to the battery can which has a polygonal shape including the corner portions. Moreover, the strain stress is likely to accumulate at the corner portions during the constricting processing, and the strength of the battery can tends to be reduced at the corner portions. In this respect, when sealing is performed with providing the constricted portion, it is not easy to employ a battery can whose shape of inner circumference includes the corner portions (esp., whose shape of inner circumference is a polygonal shape of less than 12 sides), for the purpose of ensuring a large possible amount of electrolyte.

However, in the case of employing a sealing method without providing the constricted portion, the reduction in strength of the battery can as mentioned above can be suppressed. According to one embodiment of the present invention, in which a sealing method without providing the conventional constricted portion is combined with a battery can provided with a corner portion for retaining electrolyte, it is possible to realize a battery having a high energy density and being excellent in resistance to the lifetime deterioration due to electrolyte depletion.

Specifically, in a non-limiting embodiment, the battery includes a sealing body fixed to the open rim so as to seal the opening defined by the open rim.

The sealing body has a sealing plate and a gasket disposed at the peripheral portion of the sealing plate. The gasket is compressed in the radial direction of the opening, between the end surface of the peripheral portion of the sealing plate and the open rim. Specifically, the open rim has a pressing portion for pressing the gasket against the end surface of the peripheral portion of the sealing plate. The gasket is compressed via the pressing portion in the radial direction of the opening, and the repulsive force of the gasket acts to ensure the airtightness between the sealing body and the open rim.

In other words, the open rim of the battery can presses the gasket not in the axial direction (Z direction) of the battery can but in the direction perpendicular to the Z direction (hereinafter, sometimes referred to as XY direction). In this case, the pressing force of the open rim exerted on the gasket has a larger scalar component in the XY direction than that in the Y direction.

The open rim of the battery can may have a projection as at least part of the pressing portion, the projection protruding inward in the radial direction. In this case, the gasket is compressed in the radial direction at least via the projection. Such a projection can be formed by constricting the open rim inward. The projection may be formed intermittently in a plurality of numbers along the circumferential direction of the opening, or may be formed continuously along the circumferential direction of the opening. The continuously formed projection can form an annular groove along the circumferential direction of the opening. The projection(s) can press the gasket or its side wall portion more strongly toward the end surface of the peripheral portion of the sealing plate. In this way, the airtightness between the sealing body and the open rim can be more reliably ensured.

The gasket may be of any shape, and has: for example, an inner ring portion disposed on the side facing the electrode body (the inner side) of the peripheral portion of the sealing plate; and a side wall portion covering the end surface of the peripheral portion of the sealing plate. In this case, the side wall portion is compressed in the radial direction. The gasket preferably further has an outer ring portion disposed on the outer side of the peripheral portion of the sealing plate. More specifically, the gasket preferably has an outer ring portion and an inner ring portion sandwiching the peripheral portion of the sealing plate therebetween, and a side wall portion covering the end surface of the peripheral portion of the sealing plate so as to connect the outer ring portion with the inner ring portion.

When the projection is formed intermittently in a plurality of numbers, the projections (at least two, preferably four or more projections) are provided preferably at equi-angular intervals with respect to the center of the opening.

In the height direction of the battery can, the projection is preferably substantially equal in position to the center of the end surface of the peripheral portion of the sealing plate. By aligning the position of the projection and the center position of the end surface flush with each other, in forming the projection on the open rim of the battery, the deformation of the sealing plate can be suppressed. Moreover, the pressure applied to the gasket or its side wall portion is unlikely to be uneven. Accordingly, the deformation of the gasket tends to be suppressed, and the gasket can be compressed to a higher degree. This increases the airtightness inside the can.

Here, that the projection is substantially equal in position to the center of the end surface of the peripheral portion of the sealing plate means that, in the height direction of the battery can, the difference between the position of the projection and the center position of the end surface of the sealing plate is 2% or less of a height L of the battery can.

At the center position of the end surface of the peripheral portion of the sealing plate, a recessed groove may be formed so as to correspond to the projection provided on the open rim of the battery can. By providing the recessed groove, in forming the projection on the open rim of the battery, the deformation of the sealing plate can be more effectively suppressed, and the pressure applied to the gasket or its side wall portion is less likely to be uneven. The difference between the center position of the recessed groove and the position of the projection in the height direction of the battery can is 2% or less of the height L of the battery can.

In the height direction of the battery can, the open rim is made smaller in outer diameter at its lowermost position (the innermost position in the Z direction) in contact with the gasket or its inner ring portion, than the cylindrical portion. In this case, it is preferable to provide an annular cap which covers the gasket or its outer ring portion in the Z direction and covers the outer peripheral surface of the open rim of the battery can in the XY direction. The cap serves to protect the peripheral portion of the sealing plate and the open rim of the battery can. At this time, by joining the cap to the open rim, the sealing body can be more securely fixed to the battery can. The cap may be designed in such a thickness that the outer diameter of the cap becomes almost equal to the outer diameter of the cylindrical portion.

It is desirable that the sealing plate and the gasket are integrally molded by an insert molding technique or the like. According to the integral molding, the sealing plate and the gasket are easily welded to each other. By integrally molding the sealing plate and the gasket, the sealing body can be handled as one component, which can simplify the production of the battery.

According to the above configuration, it is not necessary to press the gasket in the Z direction for hermetically sealing the battery can. This eliminates the necessity of providing the battery can with a constricted portion interposed between the gasket or its inner ring portion and the electrode body. Therefore, the shortest distance between the sealing body and the electrode body can be decreased, and the energy density inside the can tends to be increased. Specifically, the shortest distance between the sealing body and the electrode body can be set to, for example, 2 mm or less, and preferably 1.5 mm or less.

A description will be given below of a battery according to an embodiment of the present invention with reference to the drawings. It is to be noted, however, that the present invention is not limited thereto.

FIG. 1 is a schematic vertical cross-sectional view of an essential part of a battery 10 according to the present embodiment. The battery 10 is cylindrical in shape, and includes a cylindrical bottomed battery can 100, a circular-cylindrical electrode body 200 housed in the can, and a sealing body 300 sealing the opening of the battery can 100.

The battery can 100 includes: a cylindrical portion 120 housing the electrode body 200; a bottom wall 130 closing one end of the cylindrical portion 120; and an open rim 110 continuing to the other end of the cylindrical portion 120. The opening defined by the open rim 110 is closed by the sealing body 300.

Figure 2:
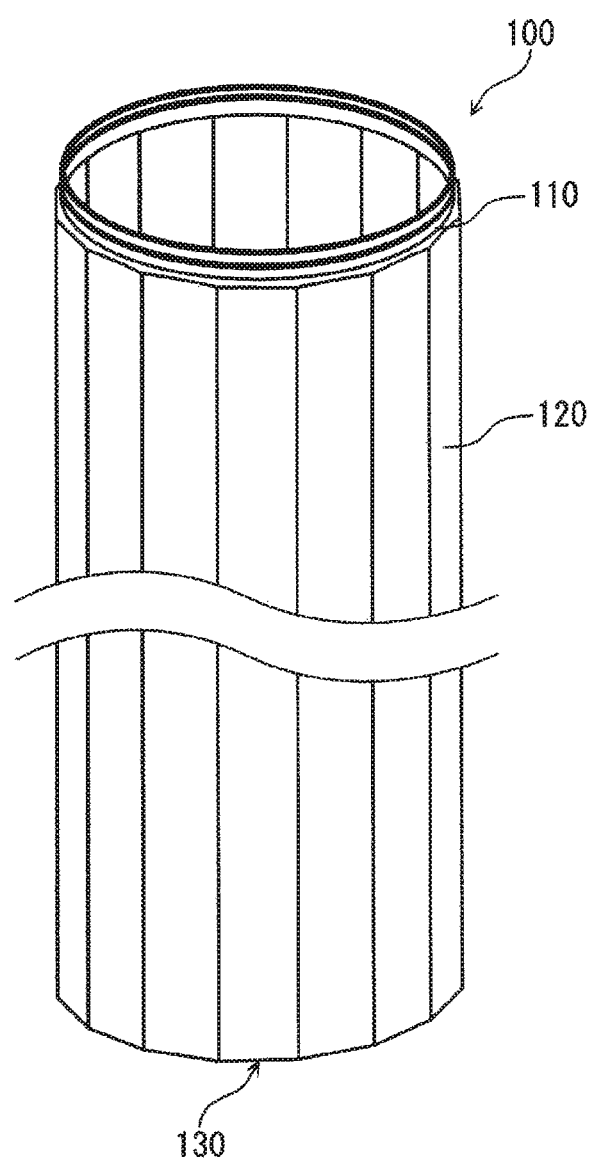
FIG. 2 An oblique view showing an appearance of a battery can in the battery.

FIG. 2 is an oblique view showing an appearance of the battery can 100 in the battery 10. In the battery can 100, the shape of inner circumference of the cylindrical portion 120 is a polygon (regular hexadecagon), and the shape of outer circumference thereof is also a polygon (regular hexadecagon). On the other hand, the open rim 110 is processed such that the shapes of inner and outer circumferences are both circular.

Figure 3:
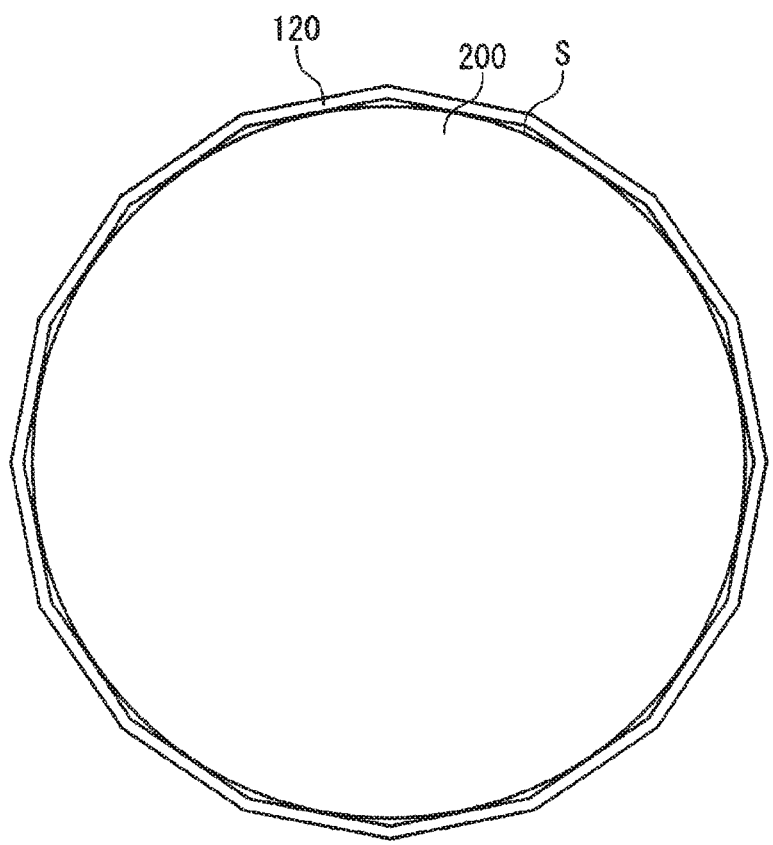
FIG. 3 A view showing a cross-sectional shape of a cylindrical portion of the battery can, taken along a plane perpendicular to the axis of the cylindrical portion, in the battery.

FIG. 3 is a view showing a cross-sectional shape of the cylindrical portion 120, taken along a plane perpendicular to its axis, in the battery 10. As illustrated in FIG. 3, the volume of the electrode body 200 is maximized when the electrode body 200 has an outer diameter substantially equal to the diameter of the inscribed circle of the regular hexadecagon defining the shape of inner circumference of the cylindrical portion 120. Even in this case, a region S where the space cannot be not occupied by the electrode body 200 is present in the vicinity of each vertex (corner portion) of the regular hexadecagon. The region S can serve to retain electrolyte.

Referring again to FIG. 1, the sealing body 300 has a sealing plate 310 and a gasket 320 disposed at a peripheral portion 311 of the sealing plate 310. The sealing plate 310 is disk-shaped and has an explosion-proof function. Specifically, the sealing plate 310 includes the peripheral portion 311 and a center region 312, both having a thick wall thickness and serving to provide structural strength, and a thin-walled portion 313 configured to exhibit an explosion-proof function. The thin-walled portion 313 is provided between the peripheral portion 311 and the center region 312. To the inner surface of the center region 312, one end of a lead wire 210 extended from a positive electrode or a negative electrode constituting the electrode body 200 is connected. Thus, the sealing plate 310 functions as a terminal of one of the electrodes.

When the internal pressure of the battery can 100 rises, the sealing plate 310 bulges outward, and the stress due to tension is concentrated, for example, on the boundary between the peripheral portion 311 and the thin-walled portion 313, causing a break to occur from the boundary. As a result, the internal pressure of the battery can 100 is released, and the safety of the battery 10 can be ensured.

The sealing plate 310 may be of any shape. In the illustrated example, the peripheral portion 311 is made thicker than the center region 312. The thick peripheral portion 311 can receive over a large area the pressure applied thereto from the open rim 110 of the battery can 100 in the radial direction of the opening, allowing the stress to be easily dispersed.

A recessed groove 3111 is formed at the center position of an end surface 311T of the peripheral portion 311 so as to correspond to a projection 111 of the open rim 110.

The gasket 320 has an outer ring portion 321 and an inner ring portion 322, and a side wall portion 323 connecting the outer ring portion 321 with the inner ring portion 322. The end surface 311T of the peripheral portion 311 of the sealing plate 310 is covered with the side wall portion 323. The outer ring portion 321 and the inner ring portion 322 sandwich the peripheral portion 311 of the sealing plate 310 therebetween, and thereby the gasket 320 is secured to the sealing plate 310.

The outer ring portion 321, the inner ring portion 322, and the side wall portion 323 are formed as an integrally molded product. The gasket 320 can be integrally molded with the sealing plate 310, for example, by an insert molding technique.

To ensure the airtightness between the open rim 110 of the battery can 100 and the sealing body 300, it is necessary that at least part of the open rim 110 presses the side wall portion 323 of the gasket 320 against the end surface 311T of the peripheral portion 311 of the sealing plate 310, compressing the side wall portion 323 in the radial direction of the opening. Here, the projection 111 protruding inward is formed on the open rim 110 along the circumference of the opening, pressing the side wall portion 323 against the end surface 311T. The open rim 110 of the battery can 100 has an end surface 110T.

The side wall portion 323 of the gasket 320 may be provided with a recessed portion 3231 in advance at a position corresponding to the projection 111. Providing the recessed portion 3231 on the gasket 320 can prevent the gasket 320 from being excessively deformed when the side wall 323 is compressed.

In the height direction of the battery can 100, the projection 111 is substantially equal in position to the center of the end surface 311T of the peripheral portion 311 of the sealing plate 310. By aligning the positions as above, the deformation of the sealing plate 310 and the gasket 320 can be suppressed, and the side wall portion 323 tends to be compressed to a higher degree. This can more reliably ensure the airtightness between the sealing body 300 and the open rim 110.

In the open rim 110 of the battery can 100, the endmost portion having the end surface 110T extends in the direction forming an angle of less than 5° with the axial direction (Z direction) of the battery can 100. This prevents the gasket 320 from being subjected to excessive stress, making it possible for the gasket 320 to ensure the airtightness more easily and reliably.

The open rim 110 of the battery can 100 is made smaller in outer diameter than the cylindrical portion 120, at the lowest position of the open rim in contact with the inner ring portion 322 of the gasket 320, in the height direction of the battery can 100 of the battery 10. The outer ring portion 321 protrudes beyond the end surface 110T of the open rim 110 in the axial direction (Z direction) of the battery can 100. In such a case, it is preferable to provide a protective member so as to cover the open rim 110 of the battery can 100 and the outer ring portion 321 of the gasket 320.

Figure 4A:
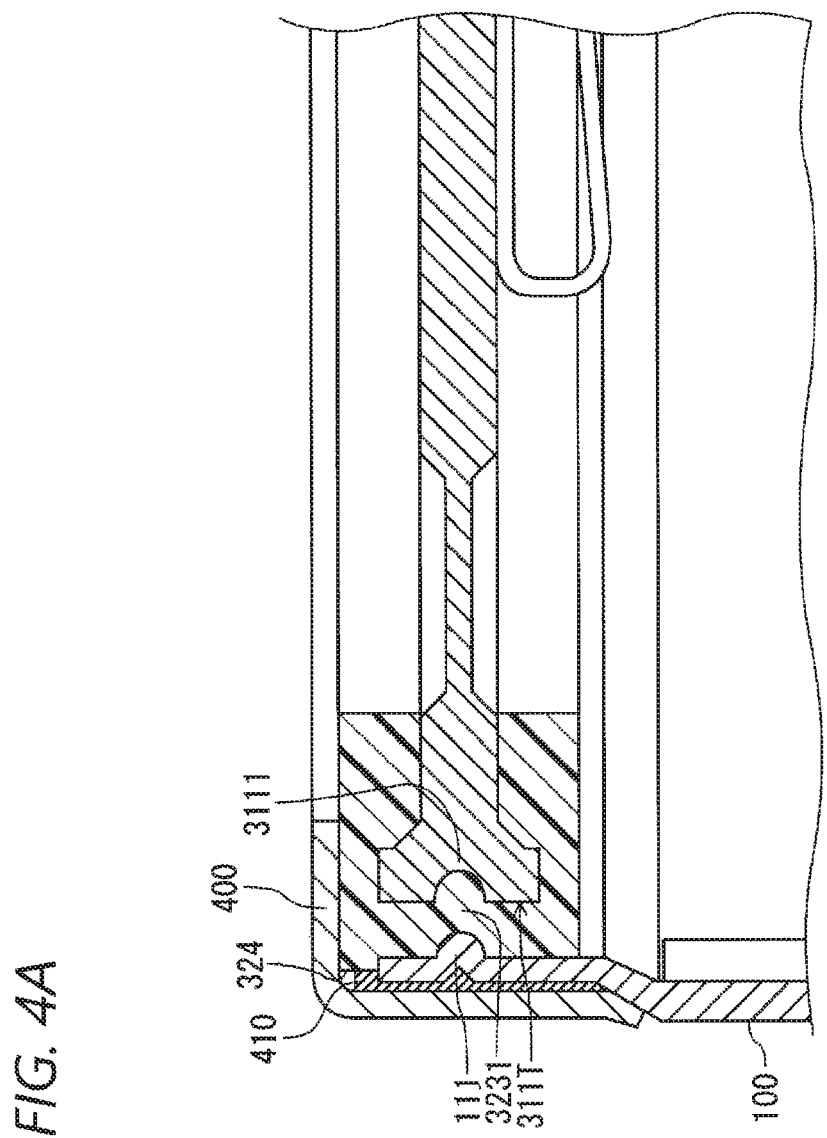
FIG. 4A A schematic vertical cross-sectional view of an essential part of the battery including a cap.
Figure 4B:
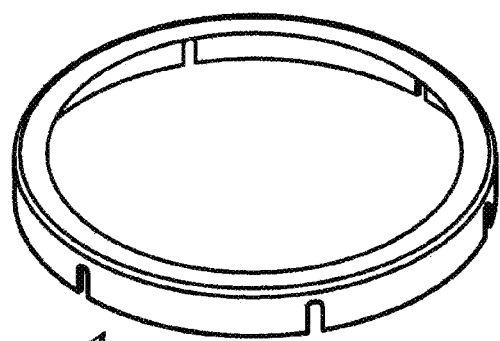
FIG. 4B An oblique view (a) of the cap and a rear view (b) thereof.

FIG. 4A is a schematic vertical cross-sectional view of an essential part of the battery 10 including a cap 400 serving as the protective member. FIG. 4B is an oblique view (a) of the cap 400 and a rear view (b) thereof.

The annular cap 400 covers the outer ring portion 321 of the gasket 320 in the Z direction, and covers the outer peripheral surface of the open rim 110 of the battery can 100 in the XY direction. The cap 400 may have any thickness, and may be designed, for example, in such a thickness that the outer diameter of the cap 400 becomes substantially equal to the outer diameter of the cylindrical portion 120. A joining material 410 may be interposed between the cap 400 and the outer peripheral surface of the open rim 110. The difference between the outer diameter or the maximum outer diameter of the cap 400 and the outer diameter or the maximum outer diameter of the cylindrical portion 120 is, for example, 20% or less of an outer diameter D of the cylindrical portion 120. The difference may be 10% or less, and may be 5% or less or 2% or less.

When the cap 400 has electrical conductivity, the cap 400 can be configured to function as a terminal having a polarity different from that of the sealing plate 310. When the cap 400 is made function as a terminal, the cap 400 is preferably joined to the open rim 110 by welding or the like. The cap 400 is an accessory, the shape of which can be flexibly designed according to use.

Figure 4B:
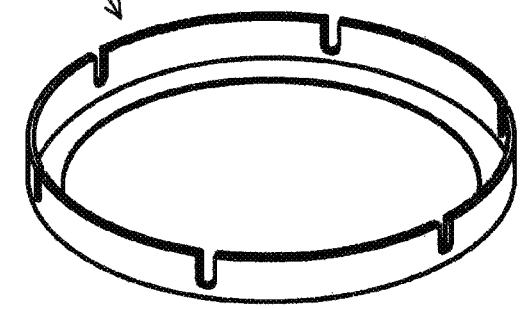

In the battery 10 illustrated in FIGS. 1 and 4, the battery can 100 does not have a constricted portion interposed between the gasket 320 or the inner ring portion 322 and the electrode body 200. Therefore, the shortest distance between the sealing body 300 and the electrode body 200 can be reduced to, for example, 1 mm or less.

Next, a description will be given of an example of a production method of the battery 10, with reference to FIG. 5.

(1) Preparation Step

Figures 5A, 5B, 5C:
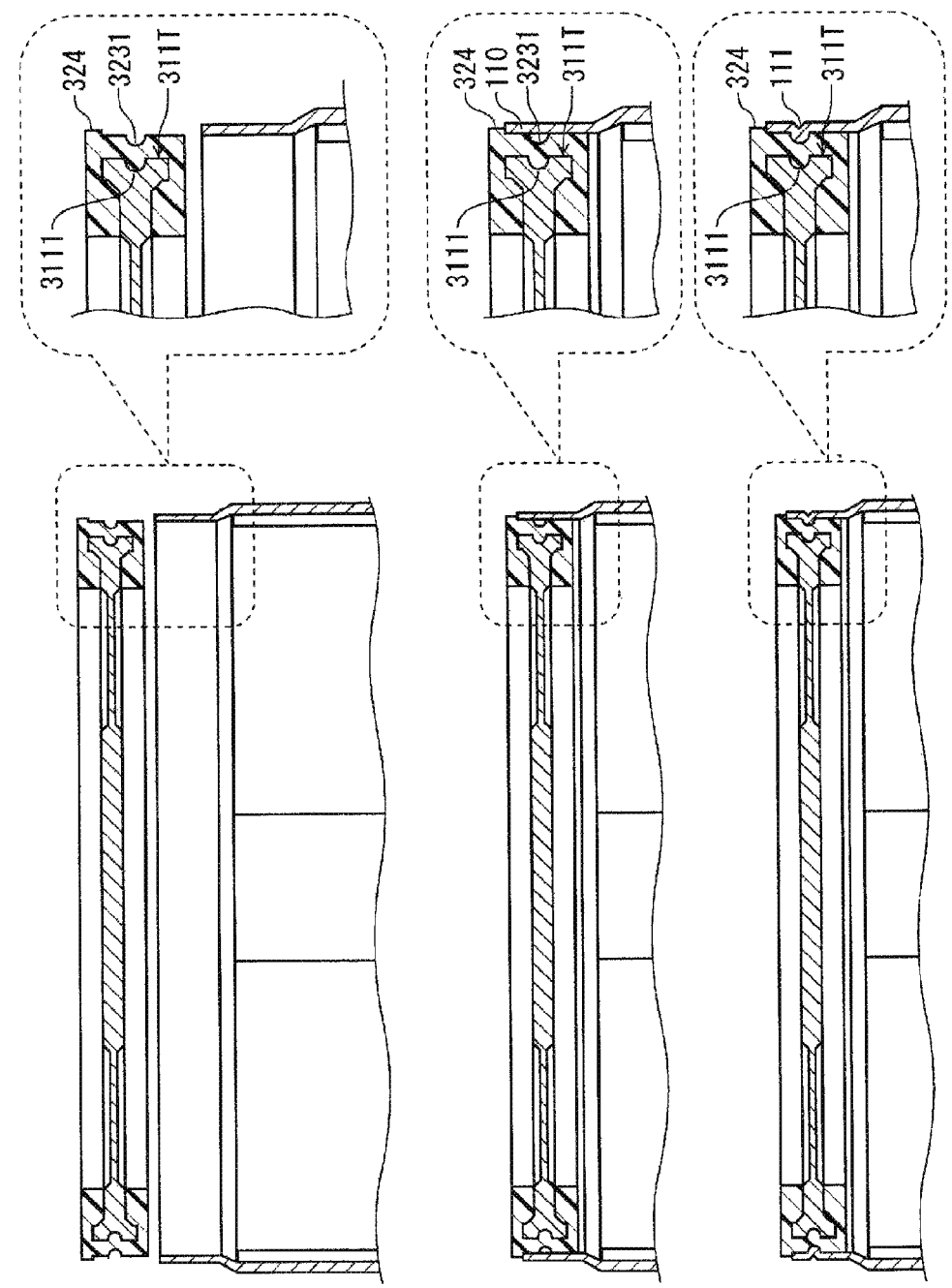
FIG. 5 Explanatory diagrams of an example of a production method of the battery including a preparation step (A), a sealing body placing step (B), and a sealing step (C).

As illustrated in FIG. 5(A), the battery can 100 including an electrode body 200 housed in the cylindrical portion 120, and the sealing body 300 are prepared first. The battery can 100 used here has a cylindrical portion whose shape of inner circumference is polygonal, as illustrated in FIG. 2. Note that before inserting the electrode body 200 into the can, unlike in FIG. 2, the battery can 100 has the open rim 110 formed sufficiently larger in diameter than the electrode body 200. Also, the projection 111 is not yet formed. After the electrode body 200 is housed in the can, the open rim 110 is constricted radially, so that the outer diameter of the open rim 110 becomes smaller than that of the cylindrical portion 120.

The sealing body 300 can be prepared by insert-molding a gasket 320 together with the sealing plate 310. The thickness of the sealing plate 310 at the peripheral portion 311 is larger than that at the center region 312, and the peripheral portion 311 is provided with the recessed groove 3111 at the center position of an end surface 311T. Likewise, the gasket 320 is provided with the recessed portion 3231 at a position corresponding to the recessed groove 3111.

The gasket 320 may be made of any material Examples of the material include polypropylene (PP), polyphenylene sulfide (PPS), polyether ether ketone (PEEK), polyethylene (PE), polybutylene terephthalate (PBT), perfluoroalkoxyalkane (PFA), polytetrafluoroethylene (PTFE), and polyamide (PA).

(2) Sealing Body Placing Step

Next, as illustrated in FIG. 5(B), the sealing body 300 is placed inside the open rim 110 of the battery can 100. The sealing body 300 may be positioned in any way, but can be positioned by, for example, as illustrated in FIG. 4, using a protruding portion provided at the upper end of the gasket 320 so as to protrude outward in the radial direction of the opening. The protruding portion may be provided in a flange-like shape, or may be provided intermittently in a projection-like shape along the circumferential direction of the opening. Alternatively, a step portion may be provided on the inner side of the open rim 110 of the battery can 100, so that the sealing body 300 can be positioned at the step portion.

(3) Sealing Step

Next, as illustrated in FIG. 5(C), a grooving processing is applied to the open rim 110 of the battery can 100 so as to be recessed inward at a position corresponding to the recessed groove 3111 and the recessed portion 3231. The projection 111 protruding inward with a constriction is thus formed on the open rim 110, so that the projection 111 presses the side wall portion 323 of the gasket 320 against the end surface 311T of the peripheral portion 311 of the sealing plate 310. As a result, the side wall portion 323 of the gasket 320 is compressed in the radial direction of the opening, and due to the repulsive force of the gasket, the airtightness between the sealing body 300 and the open rim 110 is ensured.

Next, an illustrative description will be given of a configuration of the electrode body 200, with a lithium ion secondary battery taken as an example.

The circular-cylindrical electrode body 200 is of a wound type, and is formed by spirally winding a positive electrode and a negative electrode with a separator interposed therebetween. To one of the positive and negative electrodes, the lead wire 210 is connected. The lead wire 210 is connected to the inner surface of the center region 312 of the sealing plate 310 by welding or the like. To the other one of the positive and negative electrodes, another lead wire is connected. The another lead wire is connected to the inner surface of the battery can 100 by welding or the like.

(Negative Electrode)

The negative electrode has a belt-like negative electrode current collector and a negative electrode active material layer formed on both sides of the negative electrode current collector. The negative electrode current collector is, for example, a metal film, a metal foil, or the like. The material of the negative electrode current collector is preferably at least one selected from the group consisting of copper, nickel, titanium, alloys thereof, and stainless steel. The negative electrode current collector preferably has a thickness of, for example, 5 to 30 µm.

The negative electrode active material layer contains a negative electrode active material, and optionally contains a binder and an electrically conductive material. The negative electrode active material layer may be a deposition film formed by a gas phase method (e.g., vapor deposition). Examples of the negative electrode active material include Li metal, a metal or an alloy that electrochemically reacts with Li, a carbon material (e g graphite), a silicon alloy, a silicon oxide, and a metal oxide (e.g., lithium titanate). The negative electrode active material layer preferably has a thickness of, for example, 1 to 300 µm.

(Positive Electrode)

The positive electrode has a belt-like positive electrode current collector and a positive electrode active material layer formed on both sides of the positive electrode current collector. The positive electrode current collector is, for example, a metal film, a metal foil (stainless steel foil, aluminum foil, or aluminum alloy foil), or the like.

The positive electrode active material layer contains a positive electrode active material and a binder, and optionally contains an electrically conductive material. The positive electrode active material is not limited, but may be a lithium-containing composite oxide, such as $LiCoO_2$ or $LiNiO_2$. The positive electrode active material layer preferably has a thickness of, for example, 1 to 300 µm.

Examples of the conductive material contained in each active material layer include graphite and carbon black. The conductive material is contained in an amount of, for example, 0 to 20 parts by mass per 100 parts by mass of the active material. Examples of the binder contained in the active material layer include fluorocarbon resin, acrylic resin, and rubber particles. The binder is contained in an amount of, for example, 0.5 to 15 parts by mass per 100 parts by mass of the active material.

(Separator)

The separator is preferably a microporous resin film or a nonwoven resin fabric. Examples of the material (resin) of the separator include polyolefin, polyamide, and polyamide imide. The separator has a thickness of, for example, 8 to 30 µm.

(Electrolyte)

The electrolyte may be a non-aqueous solvent in which a lithium salt is dissolved. Examples of the lithium salt include $LiClO_4$, $LiBF_4$, $LiPF_6$, $LiCF_3SO_3$, $LiCF_3CO_2$, and imide salts. Examples of the non-aqueous solvent include: cyclic carbonic esters, such as propylene carbonate, ethylene carbonate, and butylene carbonate; chain carbonic esters, such as diethyl carbonate, ethyl methyl carbonate, and dimethyl carbonate; and cyclic carboxylic acid esters, such as γ-butyrolactone and γ-valerolactone.

Although a description is given above with a lithium ion secondary battery taken as an example, the present invention is applicable to a battery employing a liquid form of any electrolyte regardless of whether the battery is a primary or secondary battery, and can realize a high energy density, while suppressing electrolyte depletion by ensuring a sufficient amount of electrolyte in the corner portion.

(Relationship Between Shape of Battery can and Amount of Retained Electrolyte)

Given that the shape of inner circumference of the cylindrical portion 120 of the battery can is a regular n-sided polygon. By employing the sealing method without providing the constricted portion as described in the present embodiment, for example, in a lithium ion battery having a diameter of 21 mm and a height of 70 mm, belt-like positive and negative electrodes which are each 0.5 mm or more wider than those used in the case of providing the constricted portion can be used, and thereby the width of the electrode body 200 (the height of the cylindrical portion) can be made 0.5 mm or more longer than that in the case of providing the constricted portion. When belt-like positive and negative electrodes each 0.9 mm or more wider than those used in the case of providing the constricted portion are used, the width of the electrode body 200 (the height of the cylindrical portion) can be made 0.9 mm or more longer than that in the case of providing the constricted portion. However, by increasing the volume of the electrode body 200, the space that can retain the electrolyte within the battery can is reduced.

Given that the minimum inner diameter of the cylindrical portion 120 of the battery can is denoted by 2r. r corresponds to the radius of the inscribed circle of a regular n-sided polygon defining the shape of inner circumference of the cylindrical portion 120.

When the width of the electrode body 200 (the height of the cylindrical portion) is made longer by Δh in order to realize a higher energy density, a reduced space $C_1$ for retaining the electrolyte can be expressed by $\pi r^2 \cdot \Delta h$.

Whereas, by making the shape of inner circumference of the cylindrical portion 120 into a regular n-sided polygon, the space that can retain the electrolyte is increased. Given that the width of the electrode body 200 (the height of the cylindrical portion) is denoted by H. The area $S_n$ of the regular n-sided polygon can be expressed by $S_n = nr^2 \tan(\pi/n)$. Therefore, an increased space $C_2$ for retaining the electrolyte can be expressed at maximum by $$C_2 = \{nr^2 \tan(\pi/n) - \pi r^2\} \cdot H.$$

If $C_2 \geq C_1$, the electrolyte can be retained in an amount equal to or higher than that before, despite the increase Δh in the width of the electrode body 200 (the height of the cylindrical portion). Modifying the above equation gives the condition for ensuring a sufficient amount of electrolyte, which can be expressed by the following formula:

$$(n/\pi)\tan(n/\pi) - 1 \geq \Delta h/H. \qquad \text{[Math Formula 1]}$$

In the above exemplified lithium ion battery, supposing that H=66 mm and the width is to be increased by Δh=0.5 mm, these values are substituted into the above formula 1. This gives n≤20, that is, the shape of inner circumference of the cylindrical portion 120 is to be a regular icosagon. Likewise, for example, for increasing the width by Δh=0.9 mm, from the above formula 1, when the shape of inner circumference of the cylindrical portion 120 is a regular hexadecagon (n≤16), the amount of electrolyte can be substantially maintained as before.

INDUSTRIAL APPLICABILITY

The battery according to the present invention is useful for non-aqueous electrolyte secondary batteries (esp., lithium ion secondary batteries) required to have a high energy density, and is suitably applicable as a power source for, for example, portable devices, hybrid vehicles, electric vehicles, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: battery, 100: battery can, 110: open rim, 110T: end surface, 111: projection, 120: cylindrical portion, 130: bottom wall, 200: electrode body, 210: lead wire, 300: sealing body, 310: sealing plate, 311: peripheral portion, 311T: end surface, 311I: recessed groove, 312: center region, 313: thin-walled portion, 320: gasket, 321: outer ring portion, 322: inner ring portion, 323: side wall portion, 3231: recessed portion, 324: protruding portion, 400: cap, 410: joining material

The invention claimed is:

1. A battery comprising:
an electrode body having a circular-cylindrical shape and being of a wound type formed by spirally winding a positive electrode and a negative electrode with a separator interposed between the positive electrode and the negative electrode;
a sealing body including a sealing plate and a gasket disposed at a peripheral portion of the sealing plate; and
a battery can housing the electrode body, wherein:
the battery can includes a cylindrical portion, a bottom wall closing one end of the cylindrical portion, and an open rim continuing to the other end of the cylindrical portion,
the cylindrical portion has a shape of inner circumference that is a polygonal shape defined by a regular polygon having 12 or more sides,
the battery can includes a space at a corner portion of the polygonal shape, the space unoccupied by the electrode body,
the open rim has a shape of inner circumference being a circular shape,
an outer diameter of the electrode body is substantially equal to an inscribed circle diameter of the polygon,
the sealing body is fixed to the open rim so as to seal an opening defined by the open rim, and
the gasket is compressed in a radial direction of the opening, between an end surface of the peripheral portion and the open rim, so that a pressing force of the open rim exerted on the gasket has a larger scalar component in a radial direction than in an axial direction of the battery can.

2. The battery according to claim 1, wherein the regular polygon has 24 or fewer sides.

3. The battery according to claim 1, wherein no constricted portion is provided between the open rim and the cylindrical portion, the constricted portion having an inner diameter smaller than an inner diameter of the open rim and a minimum inner diameter of the cylindrical portion.

4. The battery according to claim 1, wherein the gasket has an inner ring portion disposed at least on a side of the peripheral portion facing the electrode body, and a side wall portion covering an end surface of the peripheral portion, the side wall portion being in a compressed state.

5. The battery according to claim 1, wherein the open rim has a projection protruding inward in the radial direction, and the gasket is compressed in the radial direction via the projection.

6. The battery according to claim 1, wherein the open rim is smaller in outer diameter than the cylindrical portion.

7. The battery according to claim 1, wherein:
the sealing plate includes the peripheral portion, a center region and a thin-walled portion disposed between the peripheral portion and the center region, and
a thickness of the peripheral portion and the center region is greater than a thickness of the thin-walled portion.

8. The battery according to claim 1, wherein a thickness of the open rim is smaller than a thickness of the cylindrical portion.

9. A battery comprising:

an electrode body having a circular-cylindrical shape and being of a wound type formed by spirally winding a positive electrode and a negative electrode with a separator interposed between the positive electrode and the negative electrode; and a battery can housing the electrode body, wherein:

the battery can includes a cylindrical portion, a bottom wall closing one end of the cylindrical portion, and an open rim continuing to the other end of the cylindrical portion, the cylindrical portion has a shape of inner circumference that is a polygonal shape defined by a polygon, the battery can includes a space at a corner portion of the polygonal shape, the space unoccupied by the electrode body, the open rim has a shape of inner circumference being a circular shape, an outer diameter of the electrode body is substantially equal to an inscribed circle diameter of the polygon, and the polygonal shape is defined by a regular polygon having 12 or more sides.

10. The battery according to claim 9, wherein the regular polygon has 24 or fewer sides.

11. The battery according to claim 9, wherein no constricted portion is provided between the open rim and the cylindrical portion, the constricted portion having an inner diameter smaller than an inner diameter of the open rim and a minimum inner diameter of the cylindrical portion.

12. The battery according to claim 9, wherein a thickness of the open rim is smaller than a thickness of the cylindrical portion.

* * * * *